US006721880B1

(12) United States Patent
Pike

(10) Patent No.: US 6,721,880 B1
(45) Date of Patent: Apr. 13, 2004

(54) METHOD AND APPARATUS FOR MAINTAINING CONFIGURATION INFORMATION IN A COMPUTING ENVIRONMENT

(75) Inventor: Robert Pike, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 624 days.

(21) Appl. No.: 09/584,546

(22) Filed: May 31, 2000

(51) Int. Cl.[7] .............................. G06F 9/00; G06F 9/60; G06F 15/177

(52) U.S. Cl. ............................ 713/1; 713/100; 709/220

(58) Field of Search ..................... 713/1, 100; 709/220, 709/221

(56) References Cited

U.S. PATENT DOCUMENTS

| | | | | | |
|---|---|---|---|---|---|
| 5,297,286 | A | * | 3/1994 | Uehara | 713/1 |
| 5,465,365 | A | | 11/1995 | Winterbottom | |
| 5,623,666 | A | | 4/1997 | Pike et al. | |
| 5,664,170 | A | * | 9/1997 | Taylor | 709/220 |
| 5,724,512 | A | | 3/1998 | Winterbottom | |
| 5,740,431 | A | * | 4/1998 | Rail | 707/200 |
| 5,838,907 | A | * | 11/1998 | Hansen | 709/220 |
| 6,098,098 | A | * | 8/2000 | Sandahl et al. | 709/221 |
| 6,177,957 | B1 | * | 1/2001 | Anderson | 348/231.99 |

FOREIGN PATENT DOCUMENTS

JP 2001273269 A * 10/2001 ........... G06F/15/16

OTHER PUBLICATIONS

Darren Hole, Boot new kernal after update, Dec. 29, 1999, Newsgroups: alt.os.linux.mandrake, pp. 1.*
Freshd@freshmeat.net, KLILO 0.2.3—GUI to configure the lilo bootmanager, Mar. 4, 2000, pp. 1.*
Twidle et al, Domain Based Configuration and Name Management for Distributed Systems, 1988 IEEE, pp. 147–153.*

* cited by examiner

*Primary Examiner*—Thomas M. Heckler
*Assistant Examiner*—Suresh K. Suryawanshi

(57) ABSTRACT

A method and apparatus are disclosed for maintaining and distributing configuration information for a given service by the configured service itself. The configured service controls the creation of its own configuration information, as well as updates and access thereto. Any valid and authorized updates to the configuration information may be implemented by the configured service immediately. The configured service can maintain the configuration information as a synthetic file in a hierarchical file system, for access by authorized end-users (clients). The information recorded in the configuration file can be presented, maintained and updated in the same manner as a dynamic file. Access control features of the file system can be utilized to restrict access to the configuration files and the editing tools can be used to update the configuration information. All end-users can access the same configuration information using the same dynamic file.

19 Claims, 5 Drawing Sheets

Figures 5, 6:
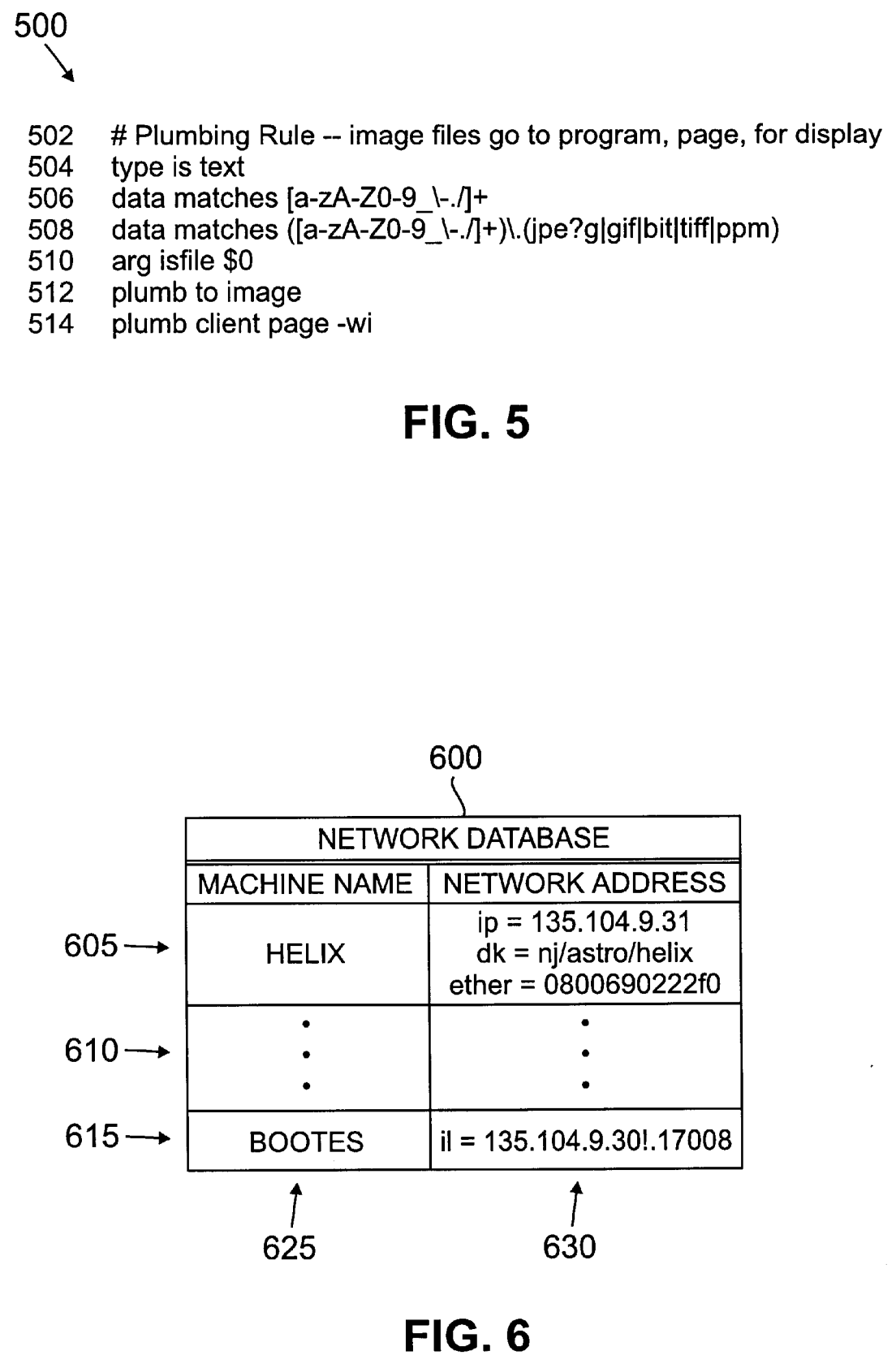

500

```
502    # Plumbing Rule -- image files go to program, page, for display
504    type is text
506    data matches [a-zA-Z0-9_\-./]+
508    data matches ([a-zA-Z0-9_\-./]+)\.(jpe?g|gif|bit|tiff|ppm)
510    arg isfile $0
512    plumb to image
514    plumb client page -wi
```

| | NETWORK DATABASE | |
|---|---|---|
| | MACHINE NAME | NETWORK ADDRESS |
| 605 → | HELIX | ip = 135.104.9.31<br>dk = nj/astro/helix<br>ether = 0800690222f0 |
| 610 → | • • • | • • • |
| 615 → | BOOTES | il = 135.104.9.30!.17008 |

METHOD AND APPARATUS FOR MAINTAINING CONFIGURATION INFORMATION IN A COMPUTING ENVIRONMENT

FIELD OF THE INVENTION

The present invention relates to the configuration of computing systems, and more particularly to methods and apparatus for maintaining configuration information in local computing systems and distributed computer environments.

BACKGROUND OF THE INVENTION

In order for a computing system to perform required functions, the computing system typically incorporates various installed hardware devices and software applications. To properly communicate with and supervise the various installed hardware devices, for example, the computing system must store configuration information that matches the physical hardware elements that are actually installed. In the event of a failure, or when routine servicing is required, a given piece of hardware on a computing system might be replaced by a compatible piece of hardware, having a different manufacturer, model number or version. Thus, this change needs to be reflected in the configuration information.

Most operating systems, such as the Windows™ operating system, commercially available from Microsoft Corporation of Redmond, Wash., provide a configuration manager for recording and updating such configuration information. Typically, the configuration manager maintains a list of the installed hardware devices, as well as the corresponding resources used by each device. The configuration manager typically monitors for hardware changes, and ensures that the proper device drivers are loaded. In addition, the configuration manager maintains the configuration information for installed software applications. Each time a new software application is installed or uninstalled on a given computing system, the configuration manager updates the file registry and other files containing software-related configuration information.

In addition, in order for the computing system to communicate over a network with one or more remote devices, the network connections must be configured. For example, most distributed computing environments utilize a network database to translate the port names and domain addresses used for convenience by a given machine or service to a particular number that is mapped to the actual hardware. The network database containing the configuration information for the various network nodes may be maintained locally by each network node or centrally by a network manager.

Configuration files are typically maintained as static files. Thus, each time a change is made to the configuration information, the updated information needs to be made available to the necessary devices and applications. For example, in many distributed computing environments, the network nodes are notified of configuration changes or automatically periodically read the network database in order to obtain the current network configuration information. Thus, in between each periodic interval, the network configuration information used by a given node may not precisely match the actual network configuration. In addition, after a new software application is installed, many operating systems, including the Windows™ operating system, require that the user reboot the computing system in order to make the updated configuration information, including the file registry, available to other applications.

A need therefore exists for a method and apparatus for dynamically maintaining configuration information. A further need exists for a method and apparatus that maintain configuration information in a convenient, file-oriented manner. Yet another need exists for a method and apparatus that allow configuration information to be managed by the configured service and updated using conventional file management tools.

SUMMARY OF THE INVENTION

Generally, according to one aspect of the invention, the configuration information for a given service is maintained and distributed by the configured service itself. Thus, the configured service controls the creation of its own configuration information, as well as updates and access thereto. Furthermore, since the configuration information is mediated by the corresponding configured service, any valid and authorized updates to the configuration information may be implemented by the configured service immediately. In one embodiment, the configured service maintains the configuration information as a synthetic file in a hierarchical file system, for access by authorized end-users (clients). As used herein, a configuration file is any local or remote file maintained by a configured service that records configuration information for hardware or software components.

When the configuration information is maintained by the configured service as a file in a hierarchical file system, the configuration information recorded in the configuration file can be accessed and updated by end-users (clients) in the same manner as a dynamic file. Thus, the configuration files can be edited by end-users using standard file system editing tools in the same manner as a conventional file and changes take effect immediately. In addition, access control features of the file system can be utilized to restrict access to the configuration files.

In this manner, the present invention allows configuration information to be accessed and updated using familiar file access operations (such as save, open, read, write). For example, changes to the configuration information can be implemented by writing to the file, or using tools to edit the file. In addition, configuration information can be obtained by reading from the file. All end-users can access the same configuration information using the same dynamic file. In one illustrative embodiment, the collection of resources, services and configuration information being used by a process is combined into a single rooted hierarchy of file names, referred to as a namespace. The resources, services and configuration information accessible to an individual namespace can be located on a single local node, or on multiple nodes distributed throughout the network.

A more complete understanding of the present invention, as well as further features and advantages of the present invention, will be obtained by reference to the following detailed description and drawings.

BRIEF DESCRIPTION OF THE DRAWINGS

FIG. 5 illustrates an exemplary set of configuration rules used by the plumbing tool of FIG. 3; and FIG. 6 is a table illustrating an exemplary network database configuration file utilized by the network node of FIG. 2.

DETAILED DESCRIPTION

Figure 1:
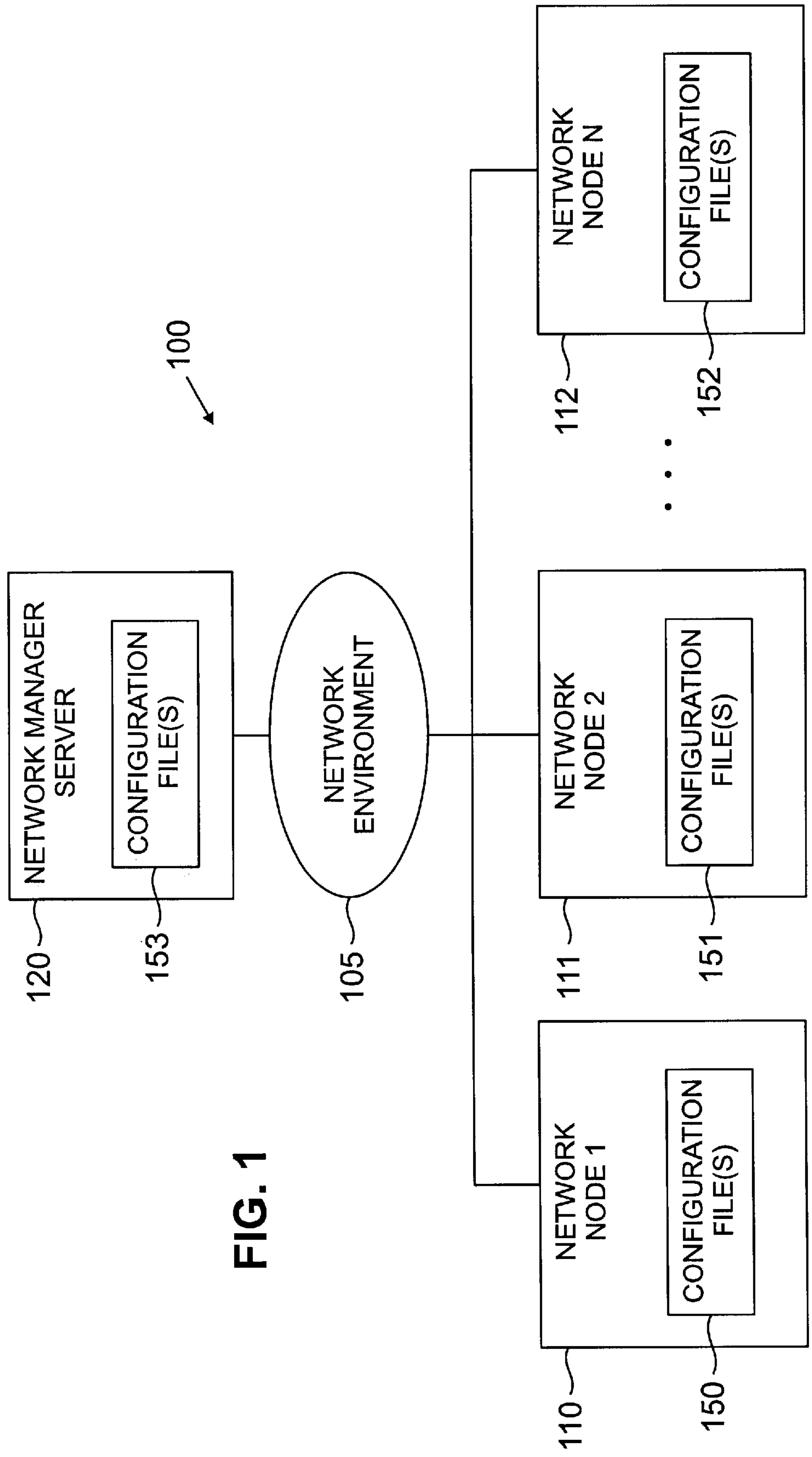
FIG. 1 illustrtes a distributed network environment where the present invention can operate.

FIG. 1 illustrates a distributed network environment 100 in which the present invention can operate. As shown in FIG. 1, the network environment 100 includes a number of network nodes 110–112 and a network manager server 120, interconnected by a network 105, such as a local area network (LAN) or a wide area network (WAN). The network nodes 110–112 may be embodied, for example, as workstations, servers and routers. While the present invention is illustrated herein using the distributed network environment 100, the present invention may be applied to any individual (i.e., stand-alone) computing device or any individual node 110–112 in the distributed network environment 100, as would be apparent to a person of ordinary skill in the art.

According to one feature of the present invention, the configuration information for a given service is maintained and distributed by the configured service itself. In one embodiment, the configured service maintains the configuration information as a synthetic file in a hierarchical file system, for access by authorized end-users (clients). As used herein, a configuration file is any local or remote file maintained by a configured service that records configuration information for hardware or software components.

By maintaining the configuration information as a file in a hierarchical file system, the configuration information can be accessed and updated by end-users (clients) in the same manner as a dynamic file. Thus, the configuration files can be accessed and edited by end-users using using familiar file access operations (such as save, open, read, write). As discussed further below in conjunction with FIG. 4, the collection of resources, services and configuration information being used by a process is combined into a single rooted hierarchy of file names, referred to as a namespace 400. The resources, services and configuration information accessible to an individual namespace can be located on a single local node 110–112, 120, or on multiple nodes distributed throughout the network environment 100.

In this manner, as discussed further below, a user can "mount" desired services into the namespace 400, in a manner discussed below, to access the service without regard to the location of the service. In addition, in accordance with one feature of the present invention, the configuration information for the configured service will automatically be included in a file in the namespace 400, and may be accessed by the user using the appropriate file name, discussed below.

As shown in FIG. 1, the individual namespaces for the network nodes 110–112 and network manager server 120 each include one or more configuration file(s) 150–153, respectively. The configuration file(s) 150–153 are maintained by a corresponding configured service and have been mounted into the individual namespace 400 for access by the node 110–112. According to one feature of the present invention, each configuration file 150–153 is maintained by the configured service and can be represented as a file in a file system. In this manner, the information recorded in the configuration file can be presented, maintained and updated as a dynamic file. The dynamic configuration files 150–153 are managed by the configured service and may be accessed by an end-user like any other file. Thus, access control features of the file system can be utilized to restrict access to the configuration files 150–153. In addition, the file editing tools provided by the file system can be used to update the configuration information.

Thus, configuration information can be updated using any conventional file management tools, such as writing to the file 150–153 or using a file editing tool to edit the file 150–153. In addition, configuration information can be obtained by reading from the file 150–153. Thus, the present invention allows the program registry file and other configuration files 150–153 to be modified through a standard interface. Furthermore, all end-users can access the same configuration information using the same dynamic file 150–153.

According to one feature of the present invention, the distributed computing environment 100 utilizes a software entity, such as an operating system or another software entity, discussed below, to manage the location of distributed resources. In this manner, the network nodes 110–112 and network manager server 120 can interact with other distributed elements, without regard to their location. In one illustrative implementation, the distributed computing environment 100 utilizes the Plan 9™ operating system, commercially available from Lucent Technologies Inc., of Murray Hill, N.J., to manage the location of distributed resources. For a detailed discussion of the Plan 9™ operating system, see, for example, the Plan 9™ Reference Manual (1997), available from Lucent Technologies Inc., or U.S. Pat. Nos. 5,465,365; 5,623,666 or U.S. Pat. No. 5,724,512, each commonly assigned to the assignee of the present invention and incorporated by reference herein.

Generally, the illustrative Plan 9™ operating system represents resources, such as storage devices, processes, services, networks, and network connections, as files, and utilizes a namespace to represent and access such resources. In this manner, the interface to each resource is file-oriented, and involves resolving names in a hierarchical tree, attaching to files by names, and accessing file contents, including the configuration files 150–153, using read and write commands. An application builds a private view of the resources and services to be accessed using a computable namespace. Each set of resources and services is represented as a hierarchy of files.

The configuration information for the resources and services is stored in the configuration files 150–153 and is accessible using familiar file access operations (open, read, write). As previously indicated, the collection of resources, services and configuration information being used by a process is combined into a single rooted hierarchy of file names, referred to as a namespace. The resources, services and configuration information accessible to an individual namespace can be located on a single local node, or on multiple nodes distributed throughout the network. Thus, file systems provided by different servers can be combined into a single, unique namespace that becomes the application's view of the distributed environment.

The illustrative Plan 9™ operating system allows the network nodes 110–112 and network manager server 120 to access local or remote files, including the configuration files 150–153, in the same manner. In this manner, the present invention extends the illustrative Plan 9™ operating system to provide dynamic configuration. As previously indicated, configuration data for each service is stored in a configuration file maintained and distributed by the configured service, in accordance with the present invention. According to another feature of the present invention, each configuration file in the distributed computing environment 100 may be implemented as a file in a hierarchical "file" system, comprised of a tree of file-like objects, that may be accessed through the namespace. In this manner, the network nodes 110–112 and network manager server 120 can access each resource, including configuration information maintained in the configuration files, in a uniform, file-oriented manner. For a general discussion of name spaces in distributed computing environments, see Roger M. Needham, Names, in Distributed Systems 315–27 (Sape Mullender ed., 2d ed. 1993).

Figure 2:
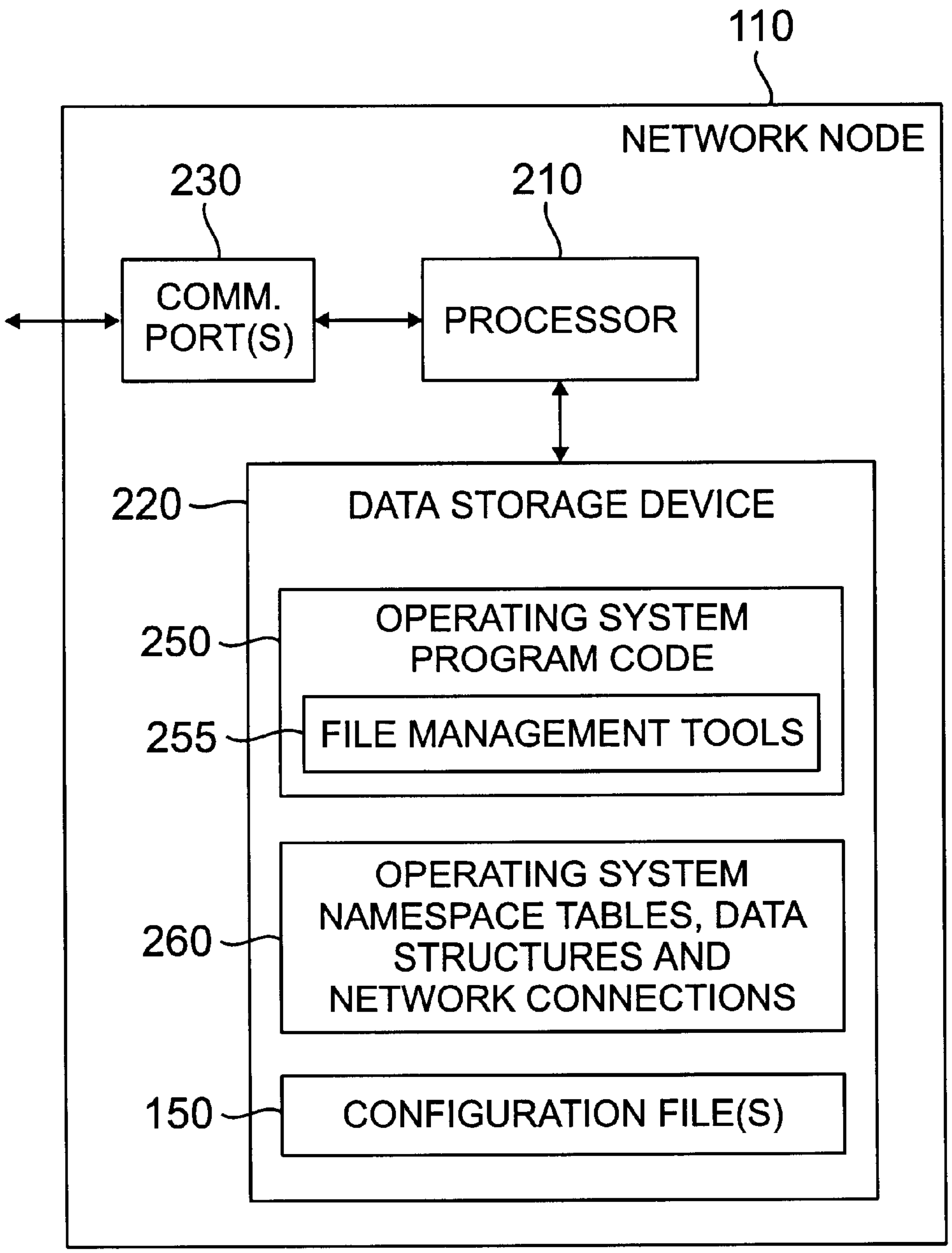
FIG. 2 is a block diagram illustrating a network node in accordance with the present invention.

FIG. 2 is a block diagram showing the architecture of an illustrative network node, such as the node 110. As indicated above, the network node 110 may be embodied, for example, as a workstation, server or router, as modified herein to execute the functions and operations of the present invention. The network node 110 includes a processor 210 and related memory, such as a data storage device 220. The processor 210 may be embodied as a single processor, or a number of processors operating in parallel. The data storage device 220 and/or a read only memory (ROM) are operable to store one or more instructions, which the processor 210 is operable to retrieve, interpret and execute.

As discussed above, the data storage device 220 includes operating system program code 250, such as the illustrative Plan 9™ operating system discussed above. As discussed above, the operating system program code 250 includes file management tools 255, used by the present invention to maintain, update and distribution the configuration information recorded in the configuration file(s). In addition, the data storage device 220 includes the tables, data structures and network connections 260 necessary for the operating system to manage the location of and communication with other network nodes. For a discussion of the tables, data structures and network connections that are created or modified to implement the management of, and communication with, distributed resources, see, for example, U.S. Pat. No. 5,724,512, incorporated by reference above.

The communications port 230 connects the network node 110 to the network environment 105, thereby linking the network node 110 to each connected node, such as the nodes 111–112, as well as the network manager 120.

Figure 3:
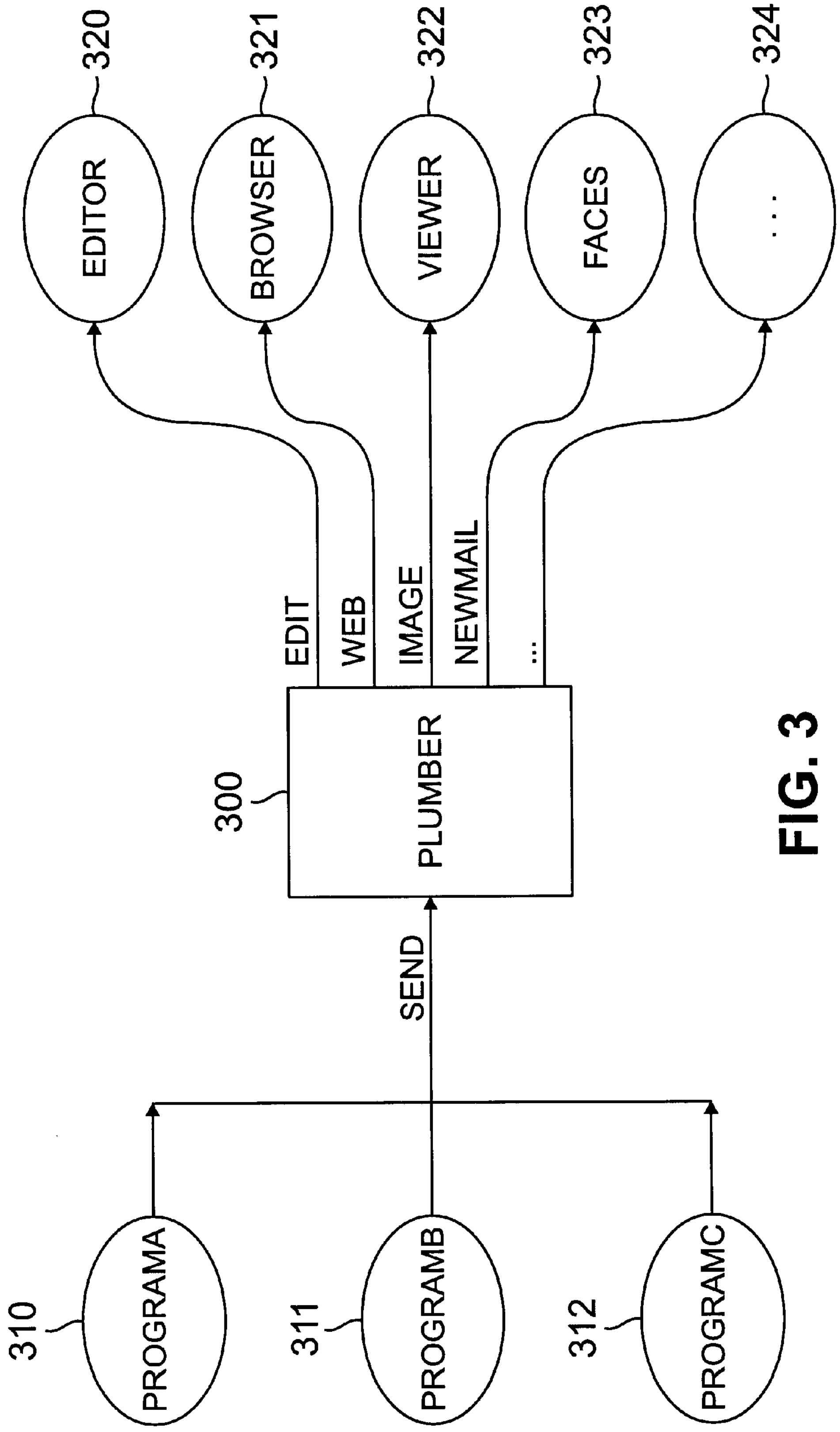
FIG. 3 is a block diagram illustrating an exemplary plumbing tool incorporating features of the present invention.

For purposes of illustration, the illustrative network node 110 is assumed to include a plumbing tool 300, shown in FIG. 3, that facilitates inter-process communication. Generally, the plumbing tool handles inter-process messages and dispatches and reformats the messages according to configuration rules (configuration information). The plumbing configuration rules contain one or more rules, each of which contain one or more patterns followed by one or more actions. Each incoming message is compared against the rules in order. If all of the patterns within a given rule succeed, one of the associated actions is taken and processing completes. As discussed further below in conjunction with FIG. 5, each rule has three components: an object, a verb and optional arguments.

Figure 4:
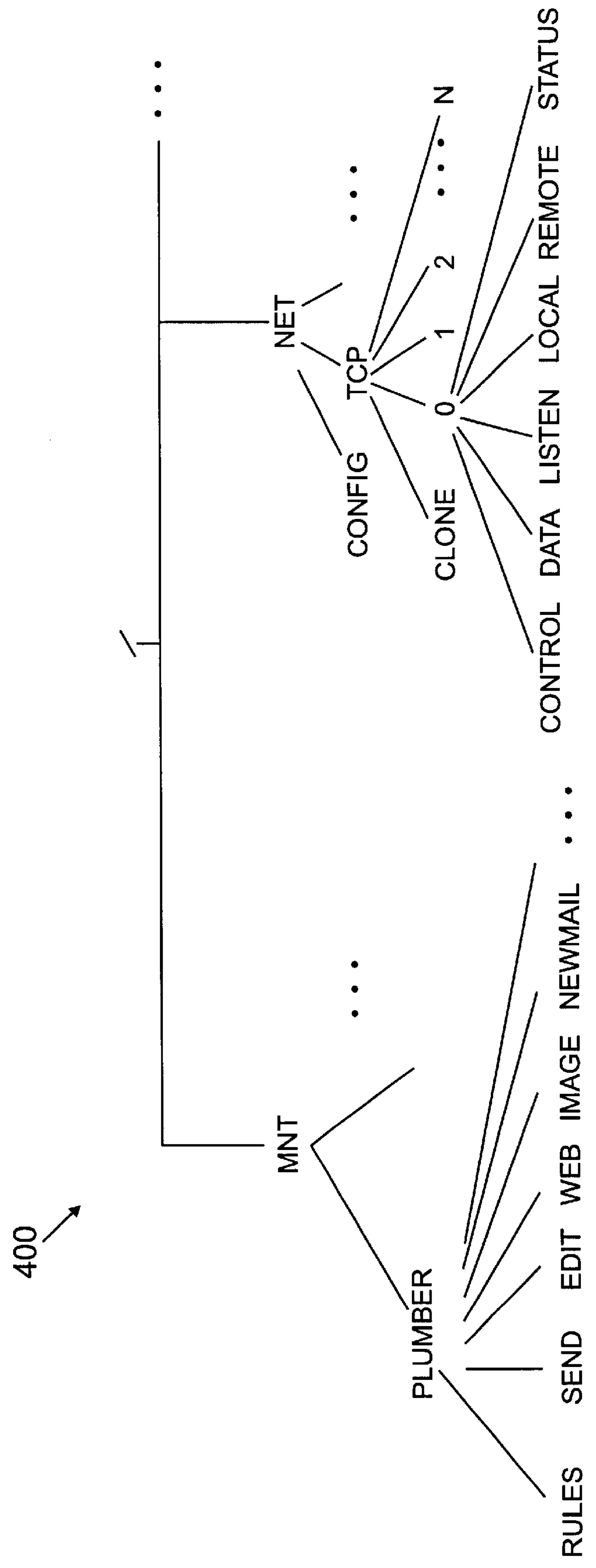
FIG. 4 illustrates a hierarchical file system incorporating configuration information for a network node in accordance with the present invention.

As shown in FIG. 3, programs 310–312 send messages by writing them to a file /mnt/plumb/send, shown in FIG. 4, maintained by the plumbing tool 300. Programs 310–312 read messages by reading them from ports, which are other files in the /mnt/plumb directory. The ports represent services 320–324, such as edit or web. For example, /mnt/plumb/edit is by convention the file from which a text editor reads messages requesting it to open and display a file for editing.

The plumbing tool 300 takes messages from the file /mnt/plumb/send and interprets their contents using configuration rules. As discussed further below in conjunction with FIG. 4, the plumbing rules specify any rewriting of the messages that must be performed and defines how to dispose of the message, such as sending the message to a port or starting a new process to handle the message.

FIG. 4 illustrates an exemplary namespace 400 including dynamic configuration files, in accordance with the present invention. The exemplary namespace 400 includes two configuration files for illustration purposes, discussed further below in conjunction with FIGS. 5 and 6. Specifically, the namespace 400 includes a configuration rules file 500, /mnt/plumb/rules, used by the plumbing tool 300 and a network database configuration file 600, /net/config, used to maintain the configuration information for the network connections.

A network, like any other resource in the distributed computing environment 100, is preferably represented as a hierarchical file system. FIG. 4 illustrates a portion of the name space 400 related to networks. The name space 400 preferably contains a directory, /net, which contains a subdirectory for each network that may be accessed, such as the networks il and tcp, as well as a subdirectory for the network database configuration file 600. In addition, each network directory, such as the network directory /net/tcp, preferably contains a clone file and a set of numbered directories, each corresponding to a network connection. Each numbered directory contains files to control and communicate on the associated connection. For a more detailed discussion of the representation of a network as a hierarchical file system, see, for example, U.S. Pat. No. 5,724,512, incorporated by reference above.

The hierarchical namespace 400 shown in FIG. 4 provides a mechanism for maintaining the relationship between names and entities, and permits the nodes 110–112 and the network manager 120 to locate desired information by means of a pathname. A pathname of a file is an alphanumeric string identifying a file by specifying a path through the hierarchical structure 400 to the file. In one embodiment, a pathname consists of the "/" character, representing the root directory, together with the names of all of the directories between the root directory and the desired file, each separated by the slash character.

In order to join the namespace of another node 111–112, 120 to the namespace 400 of the exemplary node 110, the appropriate connections through the network 105 must be established. The mechanisms for establishing the network connections and for joining the name space of a particular remote nodes 111–112, 120 to the desired location of the name space 400 associated with the node 110 are provided by the Plan 9™ operating system and are described, for example, in U.S. Pat. No. 5,724,512, incorporated by reference above.

It is noted that the mount command makes a name already in the current local name space 400, referred to herein as the "from" file, equivalent to the root of another file system, such as a remote node 111–112, 120, referred to herein as the "to" file, represented as another channel. In other words, the mount command mounts the channel representing the root directory of another file system 111–112, 120 upon a channel representing an indicated portion of the current name space 400. Thus, following execution of a mount command, references to the file specified by the "from" pathname, which has been mounted upon, and any files below it in the hierarchy 400, will be interpreted as references to the files in the file tree of the namespace of the appropriate node 111–112, 120 and thus become request messages written to the communication stream.

As previously indicated, the exemplary file /mnt/plumb/rules, shown in FIG. 5, is the text of the rule set that the plumbing tool 300 is currently using. As previously indicated, each component of a rule in the file 500 has three components: an object, a verb and optional arguments. The object identifies a part of the message, such as the source application (src), or the data portion of the message (data), or the rule's own arguments (arg), or it is the keyword plumb, which introduces an action. The verb specifies an operation to perform on the object, such as the word "is" to require precise equality between the object and the argument, or "isdir" to require that the object be the name of a directory.

The plumbing rule shown in FIG. 5 sends messages containing the names of files ending with image extensions, such as.gif and .jpg, to a program, page, for display. It is noted that the symbol "#" indicates comment lines. In accordance with the present invention, the file /mnt/plumb/rules shown in FIG. 5 may be edited like a regular file to update the plumbing rules. For example, as set forth in line 512 of FIG. 5, the rule specifies that the message should be provided to an "image" service. The user can edit this field to specify a different service 320–324 (FIG. 3), if desired. Generally, a rule in the file 500 may be cleared by truncating the file. A new rule may be added to the file 500 by appending to the file. In accordance with one feature of the present invention, new rules take effect immediately, and are made permanent by saving the file 500 in permanent storage. The plumber 300 may be restored to its initial configuration by opening (rereading) the permanent file.

It is further noted that since the plumbing server 300 manages and distributes the configuration rules 500, the plumbing server 300 can evaluate the validity of the rules 500. In this manner, an error message can be generated if an added rule has a syntax error and the added rule may be corrected dynamically.

As previously indicated, a network data base 600, shown in FIG. 6, may be utilized to provide translations between symbolic machine names and network destination addresses. When establishing a network connection, for example, a user or process may request a connection to a desired remote machine, identified by a symbolic machine name. Thus, during the connection phase, the network data base 600 is accessed to translate the indicated symbolic name to a corresponding network destination address.

Thus, the network data base 600, shown in FIG. 6, may include a pair of columns 625 and 630. Each row in the data base 600, such as the rows 605, 610 and 615, is preferably associated with a particular remote machine. Thus, each entry in column 625 indicates the symbolic machine name associated with the particular machine. The associated entry in column 630 preferably contains a list of the networks to which the particular machine is connected, together with the appropriate network destination address. Thus, the machine helix, for example, has a destination address 135.104.9.31 on the ip network. In this manner, if a user or process requests a network connection to a particular remote machine, such as the machine helix, the appropriate entry in the network data base 600 will be accessed to retrieve the corresponding network destination addresses of the machine.

The exemplary network database configuration file 600, shown in FIG. 6, is the network related configuration information currently utilized by the network manager. In accordance with the present invention, the network database configuration file 600 shown in FIG. 6 may be edited like a regular file to update the network configuration information. For example, a network destination address on a given network for a given machine may be edited using a text editor. The network configuration information for a given machine, such as the configuration information set forth in row 615, may be cleared by truncating the file. A new machine may be added to the file 600 by appending to the file. In accordance with one feature of the present invention, modifications to the network configuration information take effect immediately, and are made permanent by saving the file 600 in permanent storage. The network configuration information may be restored to its initial configuration by opening (rereading) the permanent file.

It is to be understood that the embodiments and variations shown and described herein are merely illustrative of the principles of this invention and that various modifications may be implemented by those skilled in the art without departing from the scope and spirit of the invention.

I claim:

1. A method for maintaining configuration information for a configured service in a computing system, said method comprising the steps of:

storing said configuration information in an object managed by said configured service; and presenting said configuration information to a user through said configured service, wherein updates to said presented configuration information are processed by said configured service.

2. The method according to claim 1, wherein said configuration information is represented as a file in a hierarchical file system.

3. The method according to claim 2, wherein said file is updated using file access operations.

4. The method according to claim 2, further comprising the step of providing access control features for said file.

5. The method according to claim 2, wherein said file is maintained locally at said computing system.

6. The method according to claim 2, wherein said file is maintained on a central server accessed over a network.

7. The method of claim 1, further comprising the step of evaluating whether said configuration information is valid when said configuration information is modified.

8. The method of claim 1, further comprising the step of evaluating said configuration information before making a permanent change to said configuration information.

9. A method for maintaining configuration information for a configured service in a computing system, said method comprising the steps of:

storing said configuration information as a file a hierarchical file system;

managing said file by said configured service; and presenting said configuration information to a user through said configured service using file management tools, wherein updates to said presented configuration information are processed by said configured service.

10. The method according to claim 9, wherein said file is updated using file access operations.

11. The method according to claim 9, further comprising the step of providing access control features for said file.

12. The method according to claim 9, wherein said file is maintained locally at said computing system.

13. The method according to claim 9, wherein said file is maintained on a central server accessed over a network.

14. The method of claim 9, further comprising the step of evaluating whether said configuration information is valid when said configuration information is modified.

15. The method of claim 9, further comprising the step of evaluating said configuration information before making a permanent change to said configuration information.

16. A system for maintaining configuration information for a configured service in a computing system, comprising:

a memory that stores computer-readable code; and a processor operatively coupled to said memory, said processor configured to implement said computer-readable code, said computer-readable code configured to:

store said configuration information in an object managed by said configured service; and present said configuration information to a user through said configured service, wherein updates to said presented configuration information are processed by said configured service.

17. An article of manufacture for maintaining configuration information for a configured service in a computing system, comprising:

a computer readable medium having computer readable code means embodied thereon, said computer readable program code means comprising:

a step to store said configuration information in an object managed by said configured service; and a step to present said configuration information to a user through said configured service, wherein updates to said presented configuration information are processed by said configured service.

18. A system for maintaining configuration information for a configured service in a computing system, comprising:

a memory that stores computer-readable code; and a processor operatively coupled to said memory, said processor configured to implement said computer-readable code, said computer-readable code configured to:

store said configuration information as a file a hierarchical file system;

manage said file by said configured service; and present said configuration information to a user through said configured service using file management tools, wherein updates to said presented configuration information are processed by said configured service.

19. An article of manufacture for maintaining configuration information for a configured service in a computing system, comprising:

a computer readable medium having computer readable code means embodied thereon, said computer readable program code means comprising:

a step to store said configuration information as a file a hierarchical file system;

a step to manage said file by said configured service; and a step to present said configuration information to a user through said configured service using file management tools, wherein updates to said presented configuration information are processed by said configured service.

* * * * *